(12) United States Patent
Herlein et al.

(10) Patent No.: US 9,330,032 B2
(45) Date of Patent: May 3, 2016

(54) METHOD, APPARATUS AND SYSTEM FOR CONTROLLING PERIPHERAL DEVICES IN COMMUNICATION WITH A PLAYOUT DEVICE USING A HIGH DEFINITION MULTIMEDIA INTERFACE

(75) Inventors: Gregory Charles Herlein, San Francisco, CA (US); Scott Francis, Danville, CA (US); Steve Repech, Danville, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 742 days.

(21) Appl. No.: 12/736,122

(22) PCT Filed: Jun. 25, 2008

(86) PCT No.: PCT/US2008/007897
§ 371 (c)(1),
(2), (4) Date: Sep. 10, 2010

(87) PCT Pub. No.: WO2009/113988
PCT Pub. Date: Sep. 17, 2009

(65) Prior Publication Data
US 2011/0004704 A1 Jan. 6, 2011

Related U.S. Application Data

(60) Provisional application No. 61/069,526, filed on Mar. 14, 2008.

(51) Int. Cl.
| | |
|---|---|
| *G06F 3/00* | (2006.01) |
| *G06F 13/12* | (2006.01) |
| *G06Q 30/02* | (2012.01) |
| *H04L 12/28* | (2006.01) |
| *H04N 21/41* | (2011.01) |

(Continued)

(52) U.S. Cl.
CPC .......... *G06F 13/124* (2013.01); *G06Q 30/0241* (2013.01); *H04L 12/282* (2013.01);
(Continued)

(58) Field of Classification Search
None
See application file for complete search history.

(56) References Cited

U.S. PATENT DOCUMENTS

| 8,186,773 B2 | 5/2012 | Jaeger et al. |
| 2006/0001554 A1 | 1/2006 | Morishita |

(Continued)

FOREIGN PATENT DOCUMENTS

| DE | 102005059373 | 6/2006 |
| EP | 1890291 | 2/2008 |

(Continued)

OTHER PUBLICATIONS

Search Report Dated Dec. 1, 2008.

*Primary Examiner* — Idriss N Alrobaye
*Assistant Examiner* — Richard B Franklin
(74) *Attorney, Agent, or Firm* — Robert D. Shedd (57) ABSTRACT

Embodiments of the present invention provide a method, apparatus and system for controlling a peripheral device in communication with a content playout device. In various embodiments of the present invention, high definition multimedia interface (HDMI) applications are provided for communication between a control device and a content playout device for controlling the operational functionality of a peripheral device via the content playout device using HDMI communication means and, in one embodiment, vendor specific commands. That is, associated control signals are provided for controlling and communicating with peripheral devices connected to a playout device, such as a display, for, in various embodiments, affecting the presentation of specific or requested content.

23 Claims, 4 Drawing Sheets

(51) Int. Cl.
  *H04N 21/436* (2011.01)
  *H04N 21/4363* (2011.01)
  *H04N 21/4367* (2011.01)
(52) U.S. Cl.
  CPC ....... *H04N21/4122* (2013.01); *H04N 21/4367* (2013.01); *H04N 21/43615* (2013.01); *H04N 21/43632* (2013.01)

(56) References Cited

U.S. PATENT DOCUMENTS

| | | | |
|---|---|---|---|
| 2006/0130100 A1* | 6/2006 | Pentland | 725/68 |
| 2007/0162344 A1* | 7/2007 | Jiang | 705/14 |
| 2007/0241611 A1 | 10/2007 | Shimada et al. | |
| 2008/0010412 A1* | 1/2008 | Iwata et al. | 711/128 |
| 2008/0066085 A1 | 3/2008 | Davies et al. | |
| 2008/0074547 A1 | 3/2008 | Ida | |
| 2008/0228963 A1* | 9/2008 | Hironaka et al. | 710/36 |
| 2010/0064312 A1* | 3/2010 | Francis et al. | 725/37 |

FOREIGN PATENT DOCUMENTS

| | | |
|---|---|---|
| JP | 200848136 | 2/2008 |
| WO | WO2008022301 | 2/2008 |

* cited by examiner

METHOD, APPARATUS AND SYSTEM FOR CONTROLLING PERIPHERAL DEVICES IN COMMUNICATION WITH A PLAYOUT DEVICE USING A HIGH DEFINITION MULTIMEDIA INTERFACE

CROSS REFERENCE TO RELATED APPLICATIONS

This application claims the benefit, under 35 U.S.C. §365 of International Application PCT/US2008/07897, filed Jun. 25, 2008, which was published in accordance with PCT Article 21(2) on Sep. 17, 2009 in English and which claims the benefit of U.S. provisional patent application No. 61/069,526, filed Mar. 14, 2008.

FIELD OF THE INVENTION

The present invention generally relates to device control and programming and, more particularly, to a method, apparatus and system for implementing peripheral devices using a high definition multimedia interface.

BACKGROUND OF THE INVENTION

Peripheral devices are typically connected to content processing systems and devices as either integrated solutions or as separate components connected to the content processing systems and devices. In either case, the data and information to be communicated to and from the peripheral devices is typically communicated via a proprietary cable and connector or a common cable and connector such as an RS-232 or USB cable and connector. In addition, the peripheral devices typically require device drivers for controlling and operating the devices.

In such systems and devices, the use of the proprietary cable and connector or the common cable and connector, such as an RS-232 or USB cable and connector creates extra costs and additional failure points. More specifically, the need for an additional cable results in additional systems or device costs and also increases the cost of installation of such devices and systems. The additional cables and connectors also provide additional system or device failure points.

As such, what is needed is a method, apparatus and system for implementing peripheral devices without adding cost and additional failure points to a system and/or device.

SUMMARY OF THE INVENTION

Embodiments of the present invention address the deficiencies of the prior art by providing a method, apparatus and system for implementing peripheral devices without adding cost and additional failure points to a system and/or device.

In various embodiments of the present invention, a display includes at least one serial port for connecting peripheral devices. The display can further include a control unit and an HDMI connector. A server of a system of the present invention communicates a control signal(s) (e.g., command set) and/or an application(s) to the control unit of the display; the application(s) and control signal(s) configured to query and control various functionalities of the display and the peripheral devices via the serial ports over an HDMI communication means.

In one embodiment of the present invention, a method for controlling a peripheral device in communication with a content playout device includes establishing a communication between a control device and the content playout device using a high definition multimedia interface (HDMI) application and controlling functionality of the peripheral device in communication with the content playout device using said established HDMI communication and associated commands.

In an alternate embodiment of the present invention, a control device for controlling a peripheral device in communication with a content playout device includes a memory for storing at least one of control programs and control information including vendor specific commands, media content and control parameters of the peripheral device and a peripheral device control processor configured to communicate media content and control information to the peripheral device via the content playout device over an established high definition multimedia interface (HDMI) communication means for controlling functionality of the peripheral device using the established HDMI communication means and the control information.

In an alternate embodiment of the present invention, a system for controlling a peripheral device in communication with a content playout device includes an HDMI communication means, a control device for communicating control information including at least vendor specific commands to the peripheral device via the content playout device using the HDMI communication means, and a playout control unit in communication with the content playout device for receiving the control information from the control device via the HDMI communication means and controlling functionality of the peripheral device in communication with the content playout device according to the control information.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides method, apparatus and system for implementing peripheral devices using a high definition multimedia interface. Although the present invention will be described primarily within the context of a retail advertising network environment using HDMI functionality and communication, the specific embodiments of the present invention should not be treated as limiting the scope of the invention. It will be appreciated by those skilled in the art and informed by the teachings of the present invention that the concepts of the present invention can be advantageously applied in substantially any content distribution environment for the control and implementation of peripheral devices using a high definition multimedia interface.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Figures 1, 2:
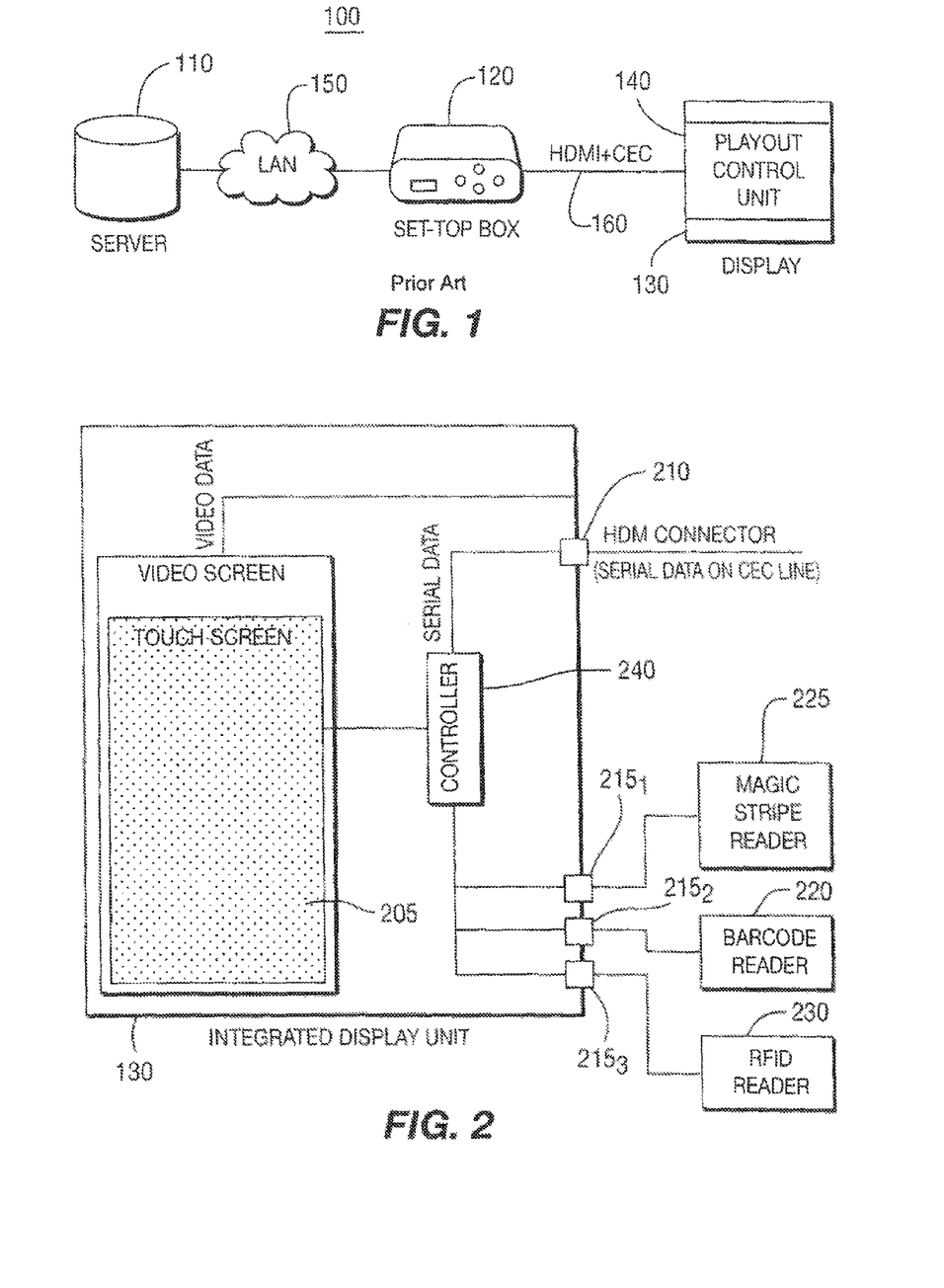
FIG. 1 depicts a high level block diagram of a system for display control and implementation using a high definition multimedia interface (HDMI) in accordance with an embodiment of a commonly owned patent application.
FIG. 2 depicts a high level block diagram of a display of the system of FIG. 1 further including serial ports for the connection of peripheral devices in accordance with an embodiment of the present invention.

FIG. 1 depicts a high level block diagram of a system for the control and implementation of a playout device such as a display using a high definition multimedia interface in accordance with an embodiment of a commonly owned invention filed as International patent application No. PCT/US2007/024811, filed Dec. 4, 2007, entitled "METHOD, APPARATUS AND SYSTEM FOR PLAYOUT DEVICE CONTROL AND IMPLEMENTATION", which is incorporated herein by reference in its entirety.

The system 100 of FIG. 1 depicts a communication system in which an embodiment of the present invention (described below) can be applied. The system 100 of FIG. 1 illustratively comprises a server 110, a set-top box (STB) 120 and a display 130. In the system 100 of FIG. 1, the display 130 includes a playout control unit 140. The system 100 of FIG. 1 further illustratively includes a Local Area Network (LAN) 150 and an HDMI (High Definition Multimedia Interface) communication means 160 with optional CEC (consumer electronic control) functionality. In the embodiment of FIG. 1, the server 110 provides video, audio and/or audio/video content to be streamed to the STB 120 over the LAN 150. For example, in one embodiment of a retail environment, the server 110 provides a plurality of media clips to be streamed to the STB 120. At the STB 120, the received streamed content (e.g., media clips) is communicated to the display 130 over the HDMI communication means 160. The playout control unit 140 of the display 130 receives the media clips and any other information (e.g., application and control signals described below with reference to vendor specific commands) from the STB 120. The control signals from the STB 120 are used by the control unit 140 of the display 130 for the control of the display parameters and functionality of the display 130 using the HDMI functionality and vendor specific commands.

In accordance with the concepts of the present invention, the display 130 of the system 100 of FIG. 1 can further include serial ports for supporting HDMI communication and functionality of peripheral devices, such as a touch-screen, bar code scanner, magnetic stripe reader, RFID reader, proximity sensor and the like, connected to the display 130 via said serial ports. For example, FIG. 2 depicts a high level block diagram of the display 130 of the system 100 of FIG. 1 further including serial ports in accordance with an embodiment of the present invention. The display 130 of FIG. 2 illustratively comprises an integrated touch screen 205, a playout control unit 240, an HDMI connector 210 and at least one serial port (illustratively three (3) serial ports) $215_1$, $215_2$ and $215_3$ (collectively serial ports 215). The serial ports 215 of the display 130 can be used to connect peripheral devices, such as the touch-screen 205, bar code scanner 220, magnetic stripe reader 225, RFID reader 230, proximity sensor and the like.

A server of the present invention, such as the server 110 of FIG. 1, communicates a control signal(s) (e.g., command set) and/or an application(s) to the playout control unit 140 of the display 130; the application(s) and control signal(s) configured to query and control various functionalities of the display 130 and the peripheral devices via the serial ports 215 over the HDMI communication means 160. For example, in one embodiment of the present invention, the server 110 communicates an application and associated control signals to the playout control unit 140 of the display 130 via the STB 120 and the HDMI communication means 160. The control signal(s) communicated to the playout control unit 140 of the display 130 from the server 110 can query the peripheral device(s) regarding its current settings and configure the peripheral devices for operation using the control signal(s) communicated via a CEC (Consumer Electronics Control) line of the HDMI communication means. That is, in accordance with the various embodiments of the present invention, HDMI communication and functionality are used in conjunction with vendor specific commands or device specific applications for querying and controlling the various operating features of peripheral devices connected to the display 130 via the serial ports 215.

Figure 3:
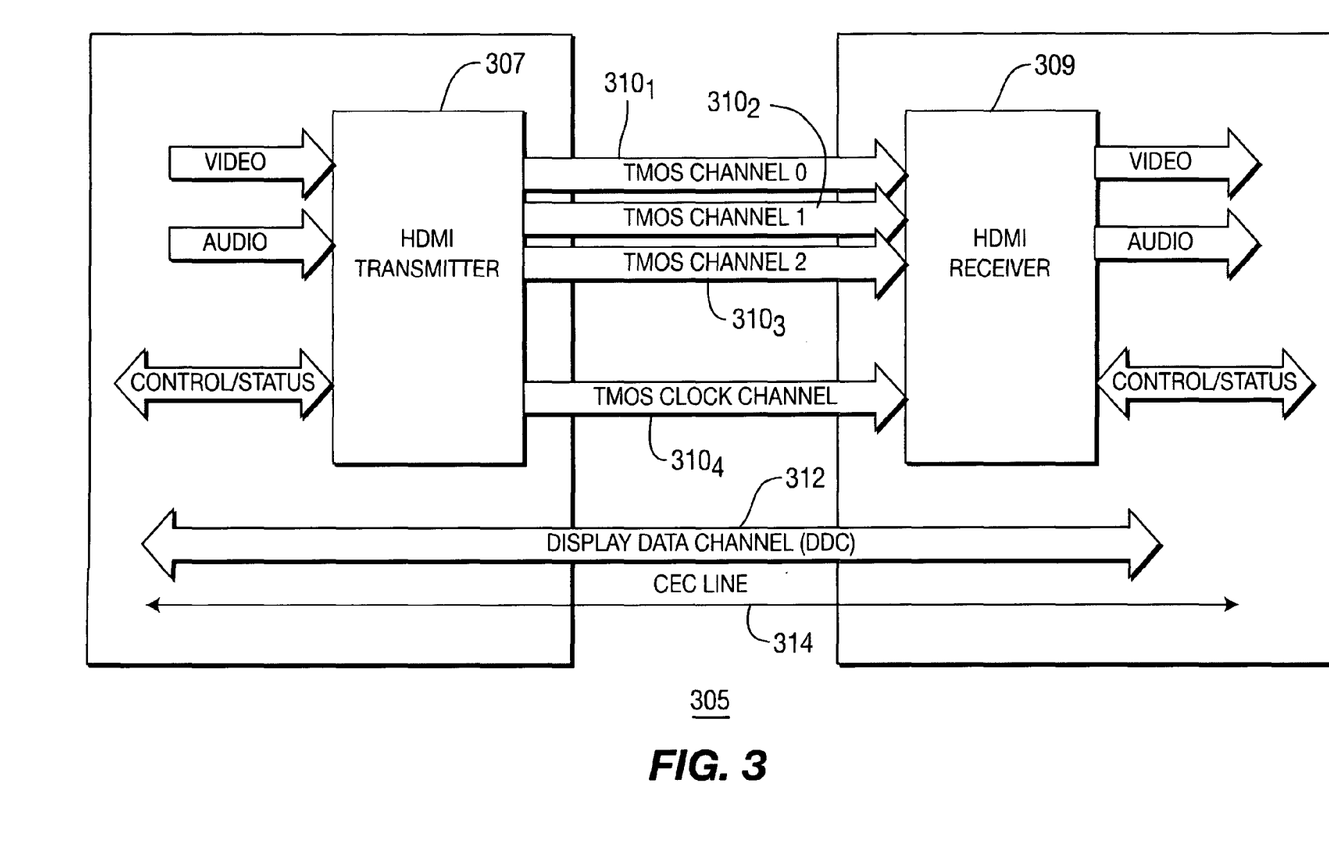
FIG. 3 depicts a high level block diagram of an HDMI communication means suitable for use in the display control and implementation system of FIG. 2 in accordance with an embodiment of the present invention.

For example, FIG. 3 depicts a high level block diagram of an HDMI communication means 160 suitable for use in the display control and implementation system 100 of FIG. 1 in accordance with an embodiment of the present invention. The HDMI communication means 160 of FIG. 3 illustratively comprises an HDMI (High-Definition Multimedia Interface) cable 305 including an HDMI transmitter 307 and an HDMI receiver 309 connected via four connectors $310_1$-$310_4$. The HDMI communication means 160 of FIG. 3 further includes a display data channel (DDC) connector 312 and a CEC (Consumer Electronics Control) line 314.

In the embodiment of FIG. 3, the HDMI connection with implemented DDC 312 is used for controlling display and peripheral devices in accordance with the present invention. More specifically, the HDMI cable 305 and connectors 310 of the HDMI communication means 160 of FIG. 3 carry four differential pairs of channels that make up the TMDS data and clock channels. These channels are used to carry video, audio and auxiliary data. In addition, the HDMI communication means 160 via the DDC connector 312 carries a DDC channel. The DDC channel is used for configuration and status exchange between a Source and a Sink. The CEC protocol of the embodiment of FIG. 3 provides high-level control functions between all of the various audiovisual devices and peripheral devices (e.g., set-top boxes and associated displays and other content playout devices, touch-screens, bar code scanners, magnetic stripe readers, RFID readers, proximity sensors and the like).

Figure 4:
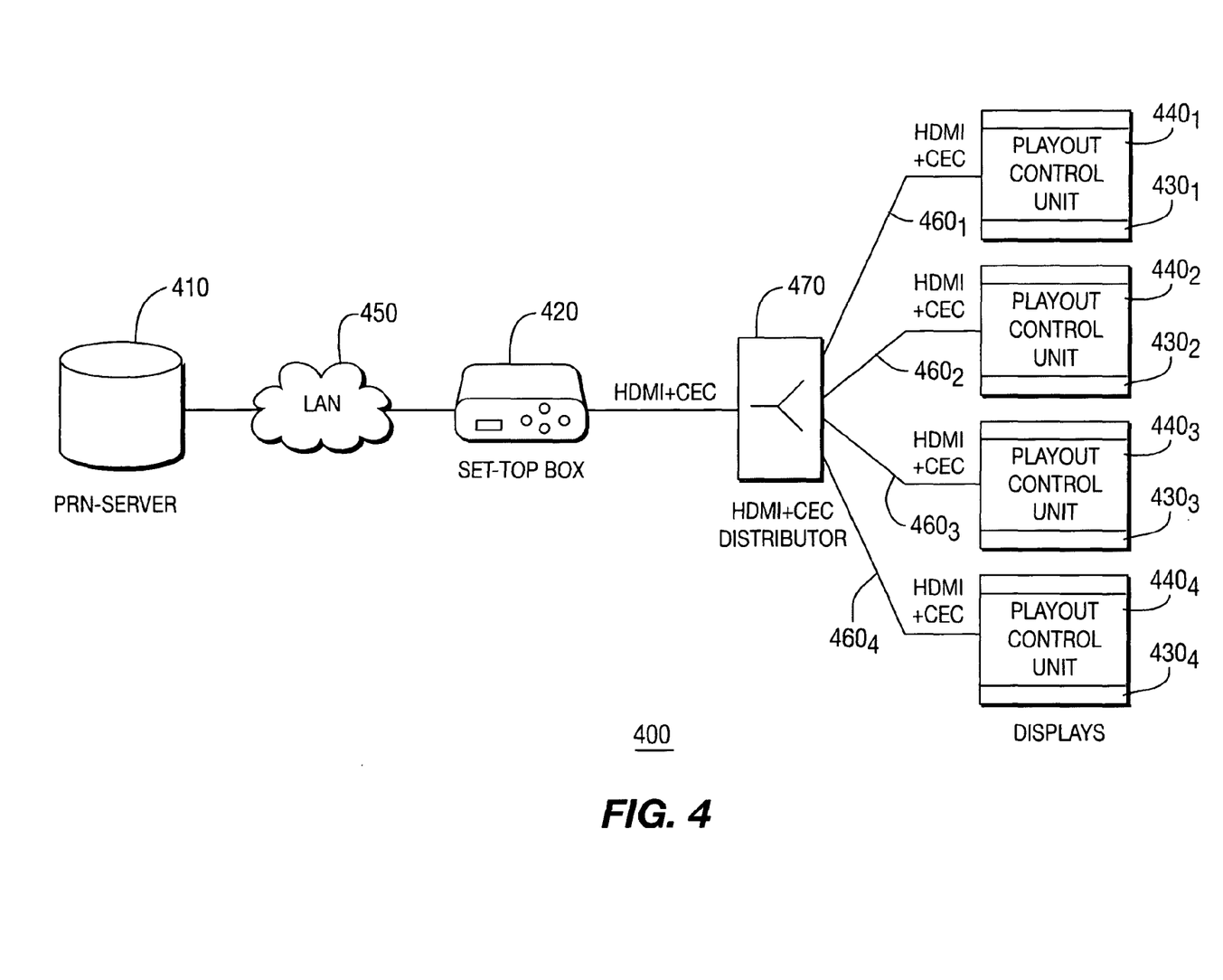
FIG. 4 depicts a high level block diagram of a display control and implementation system in accordance with an alternate embodiment of the present invention.

Although the control and implementation system 100 of FIG. 1 depicts a single display device 130 being controlled by a single STB 120, in alternate embodiments of the present invention, a STB can communicate and control a plurality of displays. For example, FIG. 4 depicts a high level block diagram of a system for the control and implementation of a display in accordance with an alternate embodiment of the present invention. The system 400 of FIG. 4 illustratively comprises a server 410, a set-top box (STB) 420 and a plurality of displays $430_1$-$430_4$. In the system 400 of FIG. 4, the displays 430 illustratively include respective playout control units $440_1$-$440_4$. The system 400 of FIG. 4 further illustratively includes a Local Area Network (LAN) 450. The system 300 of FIG. 4 further includes an HDMI distribution means 470 and a respective HDMI communication means $460_1$-$460_4$ for communication between the STB 420 and the respective playout control units $440_1$-$440_4$ of the displays $430_1$-$430_4$. Similarly and as previously described, in alternate embodiments of the present invention, the concepts of the present invention can be implemented to control a plurality of peripheral devices (not shown) connected to one or each of the displays 430.

In the embodiment of FIG. 4, the server 410 provides video, audio and/or audio/video content to be streamed to the STB 420 over the LAN 450. For example, in one embodiment of a retail environment, the server 310 provides a plurality of media clips to be streamed to the STB 420. At the STB 420, the received streamed content (e.g., media clips) is communicated to the displays 430 over the HDMI distribution means 470 and the respective HDMI communication means 460. The respective playout control units 440 of the displays 430 receive respective media clips and any other information (e.g., application and control signals) from the STB 420. The control signals from the STB 420 can be used to control the functionality of the peripheral devices (not shown) connected to the displays 430. More specifically, control signals from the STB 420 can be communicated to peripheral devices connected to serial ports 215 of the displays 430 via the CEC (Consumer Electronics Control) line 314 of the HDMI cable 305 connected to respective HDMI connectors 210 of the displays 430. The control signals can be used by the control units 440 to configure peripheral devices connected to the serial ports 215 of the displays 430 for operation. In addition, the respective playout control units 440 of the displays 430 also receive data from the peripheral devices connected to the displays 430 and communicate the data from the peripheral devices back to toward the server 410 using the CEC line 314 of the HDMI cable 305 of the HDMI communication means 460.

Figure 5:
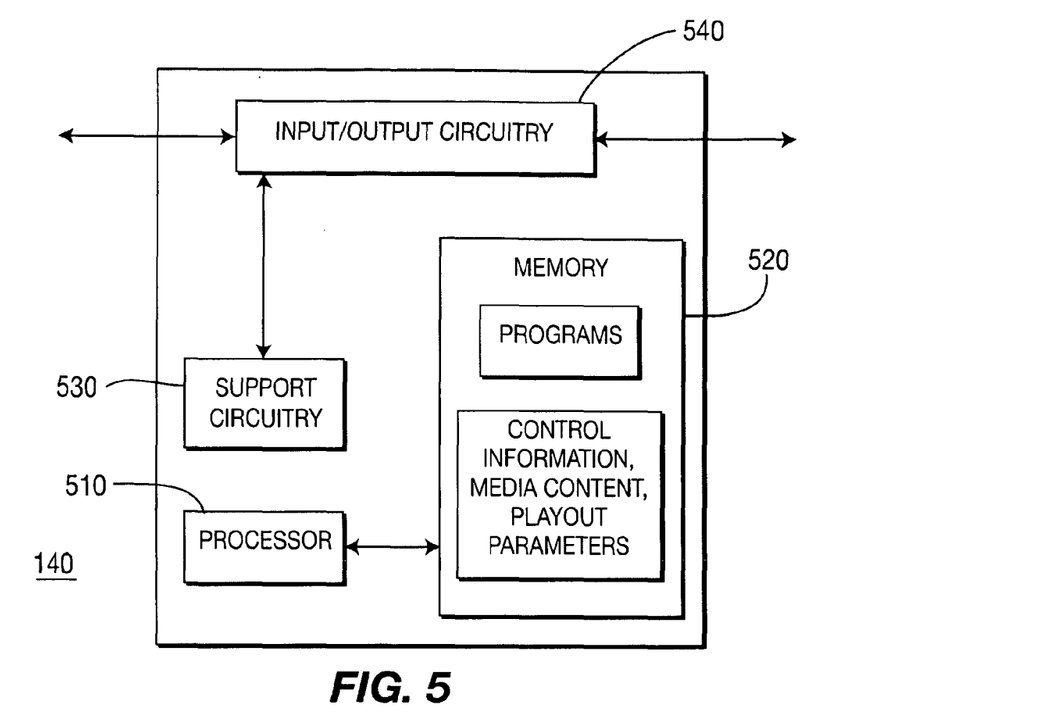
FIG. 5 depicts a high level block diagram of a control unit suitable for use in a display in accordance with an embodiment of the present invention.

FIG. 5 depicts a high level block diagram of a playout control unit 140 suitable for use in a display and peripheral device control and communication system in accordance with an embodiment of the present invention. The playout control unit 140 of FIG. 5 illustratively comprises a peripheral device control processor 510 as well as a memory 520 for storing control programs, applications, command sets, control information including vendor specific commands, device drivers, media content, playout parameters and the like. The peripheral device control processor 510 cooperates with conventional support circuitry 530 such as power supplies, clock circuits, cache memory and the like as well as circuits that assist in executing the software routines stored in the memory 520. As such, it is contemplated that some of the process steps discussed herein as software processes may be implemented within hardware, for example, as circuitry that cooperates with the peripheral device control processor 510 to perform various steps. The playout control unit 140 of FIG. 5 also contains input-output circuitry 540 that forms an interface between the various respective functional elements communicating with the playout control unit 140.

Although the playout control unit 140 of FIG. 5 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In the above described embodiments of the present invention, the concepts of the present invention are accomplished using High-Definition Multimedia Interface (HDMI) capabilities. For example, in the system of FIG. 1 having a display as described in FIG. 2 of the present invention, the STB 120 and the display 130 (and as such the playout control unit 140 of the display) are configured with HDMI communication and control capabilities. More specifically, the HDMI standards and functionality allow for vendor specific applications and commands and for device drivers to control the display 130 and peripheral devices connected to the display 130. Having such HDMI functionality, the server 110 can construct or configure an HDMI Application that when communicated to the playout control unit 140 of the display 130 by the STB 120 can configure and control the display 130 and connected peripheral devices attached to the display. As such, in accordance with the present invention, the settings of a display and connected peripheral devices can be remotely controlled and determined via the HDMI Application. In addition and as described above, the HDMI Application of the present invention can use the HDMI communication means to communicate data from the peripheral devices connected to the display back to the server. That is, the control unit 140 marshals the serial data from each of the peripheral devices connected to the serial ports of the display 130 onto the HDMI CEC line for communication toward the server side.

For example, in one embodiment of the present invention a Bar Code Scanner can be connected to a serial port 215 of the display 130. The Bar Code Scanner can be used to scan a product to trigger the delivery from the server 110 of a specific content such as an advertisement or promotional video about the scanned product. The Bar Code Scanner can also be used to scan a loyalty card (or similar device) to identify a consumer and thus potentially trigger different ads or to scan an ID card to authenticate a user (e.g., a store employee badge or similar). In such an embodiment, data from the Bar Code Scanner would be communicated by the control unit 140 toward the server 110 via the HDMI CEC line of the HDMI cable connected to the display. An STB associated with the display to which the Bar Code Scanner is attached transforms the data received from the control unit 140 and directed to the server 110 to a TCP/IP network message. Upon receiving the data from the Bar Code Scanner, the server 110 can react to the data received by communicating appropriate content and/or control information to the display to which the Bar Code Scanner is attached.

In an alternate embodiment of the present invention, similarly, a Magnetic Stripe Reader or Radio Frequency Identification (RFID) reader can be connected to a serial port 215 of the display 130. The Mag Stripe Reader or RFID Reader can also be used to scan a loyalty card (or similar device) to identify a consumer and thus potentially trigger different ads or to scan an ID card to authenticate a user (e.g., a store employee badge or similar). In such an embodiment, data from the Mag Stripe Reader or RFID Reader would be communicated by the control unit 140 toward the server 110 via the HDMI CEC line of the HDMI cable connected to the display. Again, an STB associated with the display to which the Bar Code Scanner is attached transforms the data received from the control unit 140 and directed to the server 110 to a TCP/IP network message. Upon receiving the data from the Mag Stripe Reader or RFID Reader, the server 110 can react to the data received by communicating appropriate content and/or control information to the display to which the Mag Stripe Reader or RFID Reader is attached.

In an alternate embodiment of the present invention, a Proximity Sensor can be connected to a serial port 215 of the display 130. The Proximity Sensor can be used to sense when transmitter on a cart or on a person is near. In response to information regarding the cart or person in the area, the Proximity Sensor can trigger content being displayed on the display to change accordingly. In such an embodiment, data from the Proximity Sensor would be communicated by the control unit 140 toward the server 110 via the HDMI CEC line of the HDMI cable connected to the display. Once again, an STB associated with the display to which the Bar Code Scanner is attached transforms the data received from the control unit 140 and directed to the server 110 to a TCP/IP network message. Upon receiving the data from the Proximity Sensor, the server 110 can react to the data received by communicating appropriate content and/or control information to the display to which the Proximity Sensor is attached.

Even further, although in the embodiment of the present invention depicted in FIG. 2 the display 130 is depicted as comprising an integrated touch screen 205, in alternate embodiments of the present invention, a touch screen can instead be a separate component connected to a serial port of the display. In either case, data from the touch screen is communicated by the control unit 140 to the server 110 via the HDMI CEC line of the HDMI cable connected to the display. Upon receiving the data from the Proximity Sensor, the server 110 can react to the data received by communicating appropriate content and/or control information to the display to which the touch screen is attached.

Although the system 100 of FIG. 1 depicts a server in communication with a STB for communication with a display, in alternate embodiments of the present invention, a server can communicate directly with a display, the display having receiver (STB) functionality integrated. In addition, although the system 100 of FIG. 1 depicts the server and the STB/display in communication through a LAN, in alternate embodiments of the present invention, a server can be a local server to an STB/display and communicate directly with the STB/display.

Figure 6:
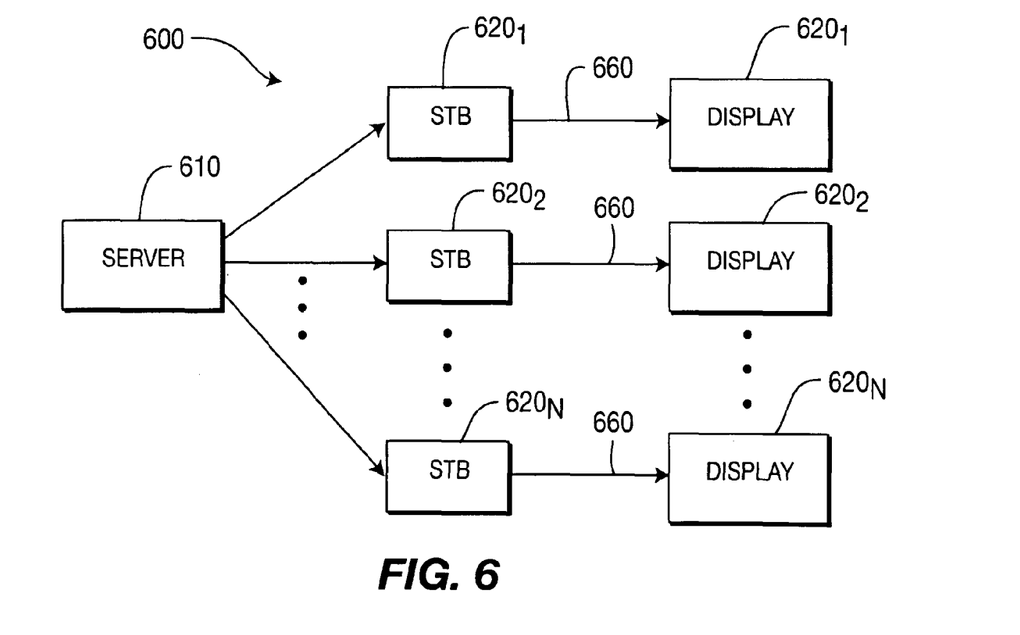
FIG. 6 depicts a high level block diagram of a content distribution system in accordance with an embodiment of the present invention.

For example, FIG. 6 depicts a high level block diagram of a content distribution system in accordance with an embodiment of the present invention. The content distribution system 600 of FIG. 6 illustratively comprises at least one server 610, a plurality of receiving devices such as tuning/decoding means (illustratively set-top boxes (STBs)) $620_1$-$620_n$, and a respective display $630_1$-$630_n$ for each of the set-top boxes $620_1$-$620_n$. The communication between the STBs 620 and the displays 630 being accomplished via HDMI communication means 660. In accordance with the present invention, in the content distribution system 600 of FIG. 6, one or more or all of the displays 630 can include serial ports for connecting peripheral devices as described above with reference to FIG. 2. That is, in the system 600 of FIG. 6, one or more of the displays 630 can include a playout control unit, an HDMI connector and at least one serial port used to connect peripheral devices such as a touch-screen, bar code scanner, magnetic stripe reader, RFID reader, proximity sensor and the like.

As described above, in the system 600 of FIG. 6, the server 610 communicates a control signal(s) (e.g., command set) and/or an application(s) to the playout control unit of the display 630; the application(s) and control signal(s) configured to query and control various functionalities of the display 630 and the peripheral devices via the serial ports over the HDMI communication means 660. For example, the server 610 communicates an application and associated control signals to the playout control unit of the display 630 via the STBs 620 and the HDMI communication means 660. The control signal(s) communicated to the playout control unit of the display 630 from the server 610 can query the peripheral device(s) regarding its current settings and configure the peripheral devices for operation using the control signal(s) communicated via a CEC (Consumer Electronics Control) line of the HDMI communication means 660. That is, in accordance with the various embodiments of the present invention, HDMI communication and functionality are used in conjunction with vendor specific commands or device specific applications for querying and controlling the various operating features of peripheral devices connected to the displays 630 via the serial ports.

Although in the system 600 of FIG. 6, each of the plurality of set-top boxes $620_1$-$620_n$, is illustratively connected to a single, respective display, in alternate embodiments, each of the plurality of set-top boxes $620_1$-$620_n$, can be connected to more than a single display. In addition, although in the content distribution system 600 of FIG. 6 the tuning/decoding means are illustratively depicted as set-top boxes 620, in alternate embodiments, the tuning/decoding means of the present invention can comprise alternate tuning/decoding means such as a tuning/decoding circuit integrated into the displays 630 or other stand alone tuning/decoding devices and the like. Even further, receiving devices can include any devices capable of receiving content such as audio, video and/or audio/video content.

Having described various embodiments for a method, apparatus and system for implementing peripheral devices using a high definition multimedia interface (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for controlling a peripheral device in communication with a content playout device, comprising:
    establishing communication between a control device and the content playout device using a high definition multimedia interface (HDMI); and
    controlling functionality of the peripheral device in communication with the content playout device using said established HDMI interface and associated commands.

2. The method of claim 1, further comprising communicating a query to the peripheral device via the content playout device to determine operational parameters of the peripheral device.

3. The method of claim 1, wherein said peripheral device is connected to a serial port of the content playout device.

4. A control device for controlling a peripheral device in communication with a content playout device, comprising:
- a memory for storing at least one of control programs and control information including vendor specific commands, media content and control parameters of the peripheral device; and
- a peripheral device control processor configured to:
  - communicate media content and control information to the peripheral device via the content playout device over an established high definition multimedia interface (HDMI) for controlling functionality of the peripheral device using said established HDMI and said control information.

5. The control device of claim 4, wherein said control device comprises a server in a retail advertising environment and said media content comprises retail advertising media.

6. The control device of claim 4, wherein said HDMI comprises an HDMI cable including an HDMI transmitter and an HDMI receiver, a display data channel connector and a consumer electronics control connector.

7. The control device of claim 4, wherein said processor is further configured to communicate a query to the peripheral device to determine operational parameters of the peripheral device.

8. A system for controlling a peripheral device in communication with a content playout device, comprising:
- a high definition multimedia interface (HDMI);
- a control device for communicating control information including at least vendor specific commands to the peripheral device via said content playout device using said high definition multimedia interface (HDMI); and
- a playout control unit in communication with the content playout device for receiving said control information from the control device via said high definition multimedia interface (HDMI) and controlling functionality of the peripheral device in communication with the content playout device according to said control information.

9. The system of claim 8, wherein said HDMI comprises an HDMI cable, a display data channel connector and a consumer electronics control connector.

10. The system of claim 8, wherein the control device is further configured to communicate a query to the peripheral device via the content playout device to determine operational parameters of the peripheral device and the playout control unit is further configured to receive the query from the control device and respond with definitions of the operations parameters of the peripheral device.

11. The system of claim 8, wherein the playout control unit comprises an integrated component of the content playout device.

12. The system of claim 8, wherein the peripheral device is connected to a serial port of the content playout device.

13. The system of claim 8, wherein said content playout device comprises a display.

14. The system of claim 8, wherein said peripheral device comprises a bar code scanner.

15. The system of claim 14, wherein said bar code scanner is used to scan a product to cause a presentation of related content on said playout device.

16. The system of claim 8, wherein said peripheral device comprises at least one of a magnetic stripe reader and a radio frequency identification reader.

17. The system of claim 16, wherein at least one of said magnetic stripe reader and said radio frequency identification reader is used to identify a consumer for presenting related content on said playout device.

18. The system of claim 8, wherein said peripheral device comprises a proximity sensor.

19. The system of claim 18, wherein said proximity sensor is used to sense the presence of an associated identification signal for causing a presentation of related content on said playout device.

20. The system of claim 8, wherein said control device comprises a content server.

21. The system of claim 8, wherein said HDMI application comprises an HDMI cable having HDMI functionality, a display data channel connector for configuration and status exchange and a consumer electronics control line for providing control functionality.

22. The system of claim 8, wherein said control device comprises a server in a retail advertising environment.

23. The system of claim 8, wherein said peripheral device is connected to a serial port of the content playout device.

* * * * *